United States Patent [19]

Kromer

[11] Patent Number: 5,420,874
[45] Date of Patent: May 30, 1995

[54] TESTING OF ELECTRICAL CIRCUITS

[75] Inventor: Stephen C. Kromer, Austin, Tex.

[73] Assignee: Advanced Micro Devices, Inc., Sunnyvale, Calif.

[21] Appl. No.: 49,886

[22] Filed: Apr. 20, 1993

[51] Int. Cl.$^6$ .............................................. G06F 13/00
[52] U.S. Cl. ................... 371/47.1; 375/354; 327/16; 327/97
[58] Field of Search ........... 307/269, 480; 371/1, 371/47.1; 375/106

[56] References Cited

U.S. PATENT DOCUMENTS

| | | | |
|---|---|---|---|
| 3,042,811 | 7/1962 | Clapper | 307/480 |
| 3,225,301 | 12/1965 | McCann | 307/269 X |
| 3,304,504 | 2/1967 | Horlander | 307/269 X |
| 3,764,920 | 10/1973 | Galcik et al. | 307/480 X |
| 5,047,658 | 9/1991 | Schrock et al. | 307/269 |
| 5,128,970 | 7/1992 | Murphy | 375/106 |
| 5,256,912 | 10/1993 | Rios | 375/111 X |

Primary Examiner—Edward R. Cosimano
Attorney, Agent, or Firm—Skjerven, Morrill, MacPherson, Franklin & Friel

[57] ABSTRACT

The invention facilitates testing of electrical circuitry which includes a circuit receiving a signal asynchronous with respect to the circuit clock. The exact clock pulse on which the asynchronous signal is asserted may be difficult or impossible to predict even when the circuitry inputs are known. However, a range of pulses can be determined during which the asynchronous signal is asserted. The sampling of the asynchronous signal is blocked until the end of the range of pulses. If it is known that at the end of the range of pulses the asynchronous signal should still be asserted provided that the circuitry functions properly, the asynchronous signal is sampled at the end of the range of pulses. Alternatively, if the asynchronous signal can be deasserted by the end of the range of pulses, the assertion of the asynchronous signal is detected and latched by the asynchronous signal pulse detector, and at the end of the range of pulses the circuit samples the value latched by the pulse detector. In both alternatives, the end of the range of pulses facilitates an unabiguous clock pulse at which the asynchronous signal should be sampled.

16 Claims, 2 Drawing Sheets

TESTING OF ELECTRICAL CIRCUITS

BACKGROUND OF THE INVENTION

1. Field of the Invention

The present invention relates to electrical circuits, and more particularly to testing of electrical circuits.

2. Description of Related Art

The increased complexity of electrical circuits has created new challenges for circuit testing. For example, in the integrated circuit area, the increased integration density and high speed create unpredictabilities that complicate testing of embedded signals as illustrated by the following example.

FIG. 1 shows an integrated circuit 110 which includes processor 114 and peripheral device 118. Device 118 is, for example, a serial port that receives data on pin 122. Port 118 asserts an interrupt signal INT for processor 114 when data is received. Signal INT is embedded, i.e., it is inaccessible from any integrated circuit pin.

Processor 114 is clocked by a clock signal CLK1. When clock CLK1 is high, processor 114 samples the signal INT and latches the signal in latch 126. When clock CLK1 is low, processor 114 latches the signal in latch 130 and uses the latched signal INTP.

Peripheral 118 is clocked by a different clock (not shown) asynchronous with respect to clock CLK1.

During testing, the integrated circuit is operated so that the signal INT is asserted at predetermined periods of time. The output signals of the integrated circuit are then compared to predetermined values obtained by simulation.

Because the clocks clocking the peripheral 118 and the processor 114 are asynchronous with respect to each other, and because of operating temperature and process variations, the exact moment of time when signal INT will be asserted during testing is difficult or impossible to predict. At high clock frequencies, signal INT can be asserted during any pulse within a range of pulses of clock CLK1. If the clock CLK1 pulse during which INT is asserted is different from the pulse predicted by simulation, the tester results will differ from the simulation results, indicating a false failure.

A typical solution is to move the edges of the input signals of circuit 110 that control the embedded signal INT until an operating point is found such that the output of the integrated circuit matches the output predicted from simulation. This process, however, is often difficult and time consuming, especially if the signal INT is embedded far into the integrated circuit. Further, due to process variations, the operating point varies from one integrated circuit to another. Moreover, even for the same circuit, the operating point varies with temperature and frequency. Finding the operating point for each integrated circuit and for each temperature and frequency is a difficult and time consuming task. In addition, if the integrated circuit is faulty, time is wasted searching for an operating point which does not exist.

Thus, there is a need for a testing technique which would allow testing complex electrical circuits including high density integrated circuits having asynchronous embedded signals, and which would allow the use of existing automatic testers and existing simulation programs but which would make the testing simpler and faster by eliminating the need to find a separate operating point for every integrated circuit and every temperature and frequency.

SUMMARY OF THE INVENTION

The present invention in some embodiments makes the testing simpler and faster and eliminates the need to find a separate operating point for every integrated circuit and every temperature and frequency. The invention is suitable for high density integrated circuits with asynchronous embedded signals.

These and other advantages of the invention are achieved in some embodiments by blocking the asynchronous signal except for certain points of time that are synchronous with the sampling circuit. In some embodiments, these points of time are the points at which the asynchronous signal is known to be asserted. In other embodiments, the asynchronous signal is latched when asserted, and at certain points of time the sampling circuit samples the latched value of the asynchronous signal.

Other features and advantages of the invention are described below. The invention is defined by the appended claims.

DESCRIPTION OF THE PREFERRED EMBODIMENTS

Figure 1:
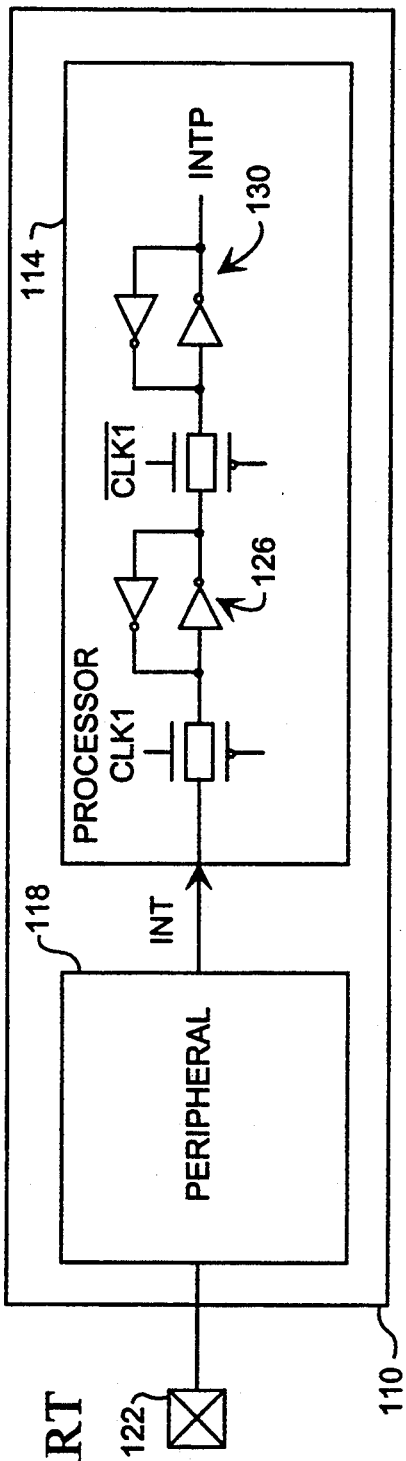
FIG. 1 is a block diagram of a prior art circuit illustrating prior art testing problems.
Figure 2:
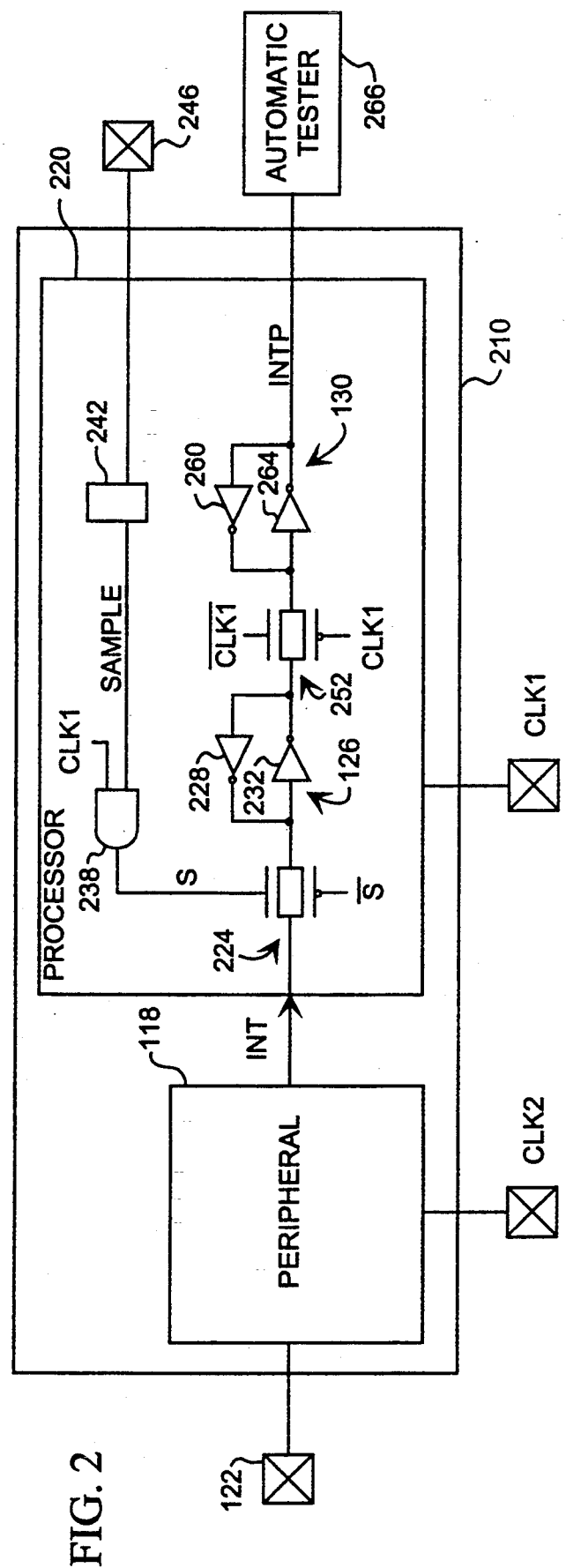
FIG. 2 is a circuit diagram illustrating the present invention.

FIG. 2 illustrates an integrated circuit 210 with embedded processor 220 and embedded peripheral 118 which are clocked, respectively, by clock signals CLK1 and CLK2. Clocks CLK1, CLK2 can be asynchronous with respect to each other. Peripheral 118 generates a signal INT for processor 220. Signal INT is synchronous with peripheral clock CLK2. In one embodiment, peripheral 118 is a serial port that receives data from pin 122 and asserts an interrupt signal INT when data is received.

Processor 220 samples the signal INT on every pulse of a signal S which is an AND of signals CLK1 and SAMPLE. More particularly, signal INT is received on one terminal of switch 224 controlled by signal S. Switch 224 is a transmission gate formed by an NMOS transistor and a PMOS transistor connected in parallel as is known in the art. Other implementations of switch 224 are used in other embodiments. When signal S is high, switch 224 is closed. When signal S is low, switch 224 is open.

After passing through switch 224, signal INT is latched by latch 126. Latch 126 is formed by cross-coupled inverters 228, 232. Other kinds of latches are used in other embodiments.

Signal S is the output of AND gate 238 whose inputs are processor clock CLK1 and signal SAMPLE. Signal SAMPLE is derived from one bit of register 242 which in some embodiments is accessible by executing an instruction on the processor. In some embodiments, register 242 is accessible from one or more external pins such as pin 246. Signal SAMPLE is synchronous with processor clock CLK1. In normal operation, signal SAM- PLE is held high, and thus signal INT is sampled on every pulse of clock CLK1.

The output of latch 126 is connected to switch 252. Switch 252 is a transmission gate. Other types of switches are used in other embodiments. Switch 252 is closed when processor clock CLK1 is low. Switch 252 is open when CLK1 is high.

When CLK1 is low, the output of latch 126 is delivered through switch 252 to the input of latch 130. Latch 130 is formed by cross-coupled inverters 260, 264. Other kinds of latches are used in other embodiments. Signal INTP at the output of latch 130 is provided to circuitry (not shown) within processor 220.

As noted above, in normal operation, signal SAMPLE is high. Thus, signal INT is sampled every time clock CLK1 is high, and the sampled signal INTP is made available to other circuitry within processor 220 every time when CLK1 is low.

Figure 3:
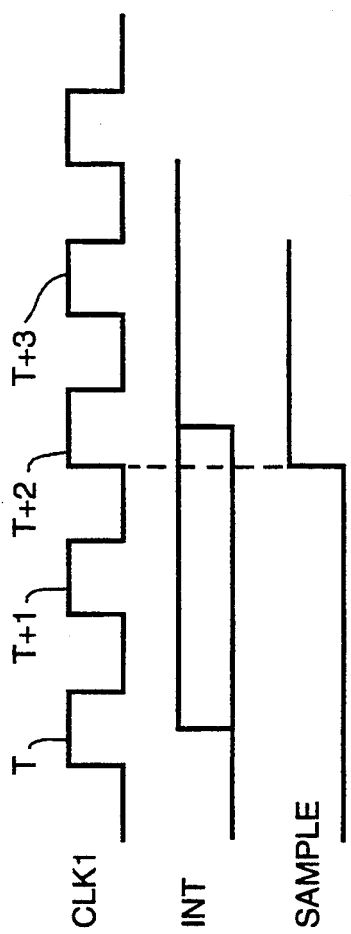
FIG. 3 shows timing diagrams for the circuit of FIG. 2.

In test mode, signal SAMPLE is set low to block the signal INT until it is certain that signal INT is asserted. For example, suppose that the simulation predicts the assertion of signal INT during a high pulse T of processor clock CLK1 (FIG. 3). Suppose, however, that due to temperature and process variations, signal INT may be asserted up to two pulses later, that is, during pulse T+1 or T+2. In this case, signal SAMPLE is kept low during pulses T and T+1. Hence, the pulses of signal S are suppressed, and signal INT is blocked. On the rising edge of pulse T+2, signal SAMPLE is driven high. Signal INT is therefore sampled at pulse T+2 at the end of which signal INT should be high provided that the integrated circuit functions properly. Sampling signal INT high at pulse T+2 and low at pulses T and T+1 is simulated, and the simulated results are compared with the output signals of integrated circuit 210 to test the integrated circuit using automatic tester 266.

In some embodiments, signal SAMPLE is asserted high on the rising edge of pulse T+3. Since signal INT is high during pulse T+3 when the integrated circuit functions properly, sampling the signal INT high during pulse T+3 and low during pulses T, T+1, T+2 can be simulated to test the integrated circuit.

More generally, signal INT is blocked until a clock CLK1 pulse at which signal INT should be asserted, and signal INT is sampled at that pulse.

Figure 4:
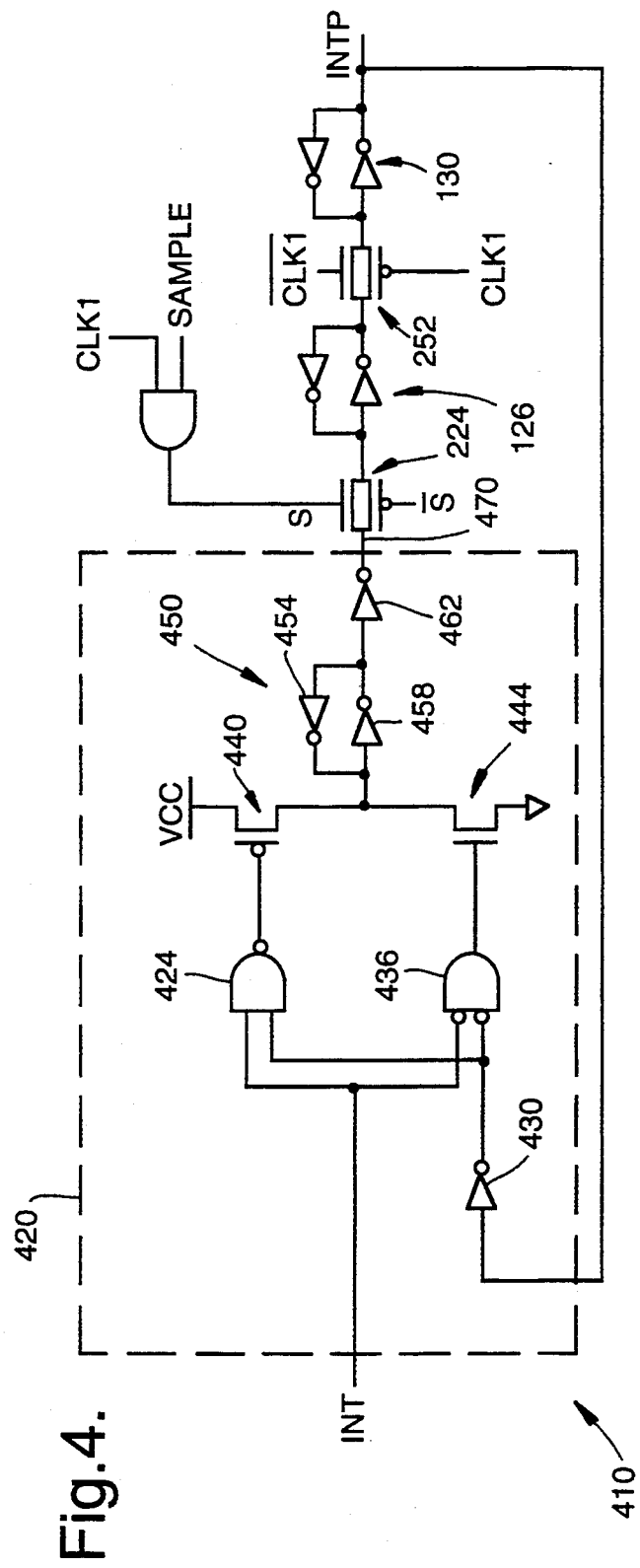
FIG. 4 is a circuit diagram illustrating another embodiment of the present invention.

If signal INT is asserted only for a short period of time, the high value of signal INT is latched in some embodiments until signal SAMPLE is asserted. One such embodiment is illustrated in FIG. 4. Only those portions that are different from FIG. 2 are shown. The integrated circuit 410 of FIG. 4 includes a pulse detector 420 for detecting and latching the pulses of signal INT. Signal INT is received on one input of NAND gate 424 of detector 420. The output signal INTP from latch 130 is connected to the input of inverter 430 whose output is connected to the other input of gate 424. Signal INT is connected to one input of NOR gate 436. The output of inverter 430 is connected to the other input of gate 436. The output of gate 424 is connected to the gate of PMOS transistor 440. The output of gate 436 is connected to the gate of NMOS transistor 444. The source of transistor 440 is connected to power supply voltage VCC. The source of transistor 444 is connected to ground. The drains of transistors 440, 444 are connected to each other and to the input of latch 450. Latch 450 is implemented by cross-coupled inverters 454, 458. Other kinds of latches are used in other embodiments. The output of latch 450 is connected to the input of inverter 462 whose output 470 is the output of pulse detector 420. Output 470 is connected to switch 224.

As can be seen from De Morgan's theorem, the signal on the output of gate 424 is $\overline{INT}$+INTP. The signal on the output of gate 436 is $\overline{INT.INTP}$. Thus when the signals INT and INTP have the same values, the output of gate 424 is high and the output of gate 436 is low. Transistors 440, 444 are off, latch 450 holds the previously latched value, and the signal on output 470 remains unchanged. See Table 1 below.

If the signals INT, INTP have different values, one of transistors 440, 444 is on while the other transistor is off, and the signal on output 470 has the same value as signal INT. See Table 1.

TABLE 1

| INT | INTP | 470 |
|---|---|---|
| 0 | 0 | Unchanged |
| 1 | 1 | Unchanged |
| 0 | 1 | 0 |
| 1 | 0 | 1 |

When SAMPLE is high, the signal on output 470 propagates to INTP when the clock CLK1 is pulsed. Thus, if signals INT and INTP have different values, their values become equal when SAMPLE is high and the processor clock CLK1 is pulsed.

During testing, SAMPLE is driven low when signals INT and INTP are determined by simulation to be both low. Then, if signal INT becomes high while SAMPLE is low, the high value is latched on output 470. If signal INT then returns to the low value, the signal on output 470 remains unchanged because INTP is also low—INTP remains low while SAMPLE is low.

When SAMPLE is driven high and clock CLK1 is high, the value on output 470 is sampled and latched by latch 126. When clock CLK1 becomes low, the value in latch 126 propagates to signal INTP. Switch 224 becomes open preventing the possibly changed signal on output 470 from affecting the signal INTP.

In some embodiments, in circuits 210 and 410, SAMPLE is asserted high for at most one period of clock CLK1 to reduce or eliminate the possibility of INT changing from low to high while SAMPLE is asserted. If INT becomes high while SAMPLE is asserted, the assertion of INT while SAMPLE is asserted could be missed by processor 220 if processor 220 fails to distinguish between this INT assertion and the previous INT pulse.

While the invention has been illustrated with respect to the embodiments described above, other embodiments and variations are within the scope of the invention. The invention is not limited to use with a processor and a peripheral device, but the invention is used with other kinds of circuits in some embodiments. The invention is not limited to interrupt signals. The invention is not limited by any particular implementation of latches, switches, logic gates and transistors, and the invention is not limited by any particular logic circuitry or technology. Other embodiments and variations are within the scope of the invention as defined by the following claims.

What is claimed is:

1. A method of testing an electrical circuit having first and second circuit sections, the first circuit section being clocked by a clock signal and responsive to a first input signal from a second circuit section, comprising the steps of:

identifying a clock signal pulse at which a second input signal anticipatory of the first input signal is substantially certain to be asserted for a properly functioning second circuit section;

identifying a range of clock signal pulses preceding the identified clock signal pulse within which the second input signal may be asserted for a properly functioning second circuit section;

determining a first circuit section response characteristic to the second input signal after the identified range;

blocking the first input signal from the first circuit section during the identified range of pulses;

unblocking the first input signal after the blocking step;

generating a first circuit section response characteristic to the unblocked first input signal; and comparing the generated response to the determined response to test the electrical circuit.

2. The method of claim 1 further comprising the steps of:

latching by a latch a predetermined value of said first input signal if said first input signal assumes said predetermined value; and following the latching step, sampling the value latched by said latch when said first input signal is unblocked.

3. The method of claim 1 wherein said first input signal and said clock signal are asynchronous with respect to each other.

4. A method as in claim 1 further comprising the steps of:

operating said electrical circuit so that, if said electrical circuit functions properly, said first input signal assumes a predetermined value within the range of clock signal pulses;

detecting said predetermined value of said first input signal;

latching an intermediate signal representing said predetermined value of said first input signal if said predetermined value of signal first input signal is detected;

blocking said intermediate signal from other circuits in said electrical circuit during said range of clock signal pulses starting from the beginning of said range of pulses;

unblocking said intermediate signal upon completion of the intermediate signal blocking step to allow said electrical circuit to sample said signal; and providing an output signal representing said intermediate signal unblocked in said intermediate signal unblocking step.

5. A method as in claim 4, wherein said first input signal is identical to said intermediate signal.

6. A method as in claim 4, wherein said predetermined value is detected by feeding back said output signal to a detector circuit.

7. An interrupt processor comprising:

a first switch having a first terminal coupled to an interrupt signal line, a second terminal, and a control terminal;

a latch having an input coupled to the second terminal of the first switch and output; and a second switch having a first terminal coupled to a clock signal line, a second terminal coupled to the control terminal of the first switch, and a control terminal coupled to a sampling control signal line to receive a sampling control signal, the sampling control signal having a first state during normal mode, and making a transition from a second state to the first state after a predetermined interval during test mode;

wherein during the normal mode, a clock signal on the clock signal line is applied to the first switch through the second switch to sample a first interrupt signal on the interrupt signal line; and during the test mode, the clock signal is applied to the first switch through the second switch after the predetermined interval to sample the first interrupt signal, the predetermined interval determined by identifying a clock signal pulse at which a second interrupt signal anticipatory of an asserted first interrupt signal is substantially certain to be asserted and identifying clock signal pulses preceding the identified clock signal pulse within which the second input signal may be asserted, the identified clock signal pulses being the predetermined interval.

8. The interrupt processor of claim 7 wherein said sampling control signal is synchronous with said clock signal.

9. The interrupt processor of claim 7 wherein said first interrupt signal is inaccessible from any external pin of said interrupt processor.

10. An interrupt processor as in claim 7 wherein the first switch is a pass gate and the second switch is an AND gate, the first terminal and the control terminal of the second switch being inputs to the AND gate, and the second terminal of the second switch being an output of the AND gate.

11. An interrupt processor as in claim 7 further comprising an additional latch, the interrupt signal line being coupled to an input of the additional latch, and the first terminal of the first switch being coupled to an output of the additional latch.

12. An integrated circuit comprising:

a circuit C1 for processing a signal S1 during a test mode and during a normal mode, said circuit C1 comprising:

a switch having an input for receiving said signal S1 said switch when closed allowing said circuit C1 to sample said signal S1, and having a control terminal; and a logic gate, having an output coupled to said control terminal of said switch, for generating an output signal S2 for controlling said switch, said logic gate having a first input for receiving a clock signal and second input for receiving a signal SA, wherein said signal S2 opens and closes said switch during each clock signal period in normal mode and selectively opens and closes said switch only during clock signal periods which correspond to an assertion of signal SA in test mode; and a latch L1 for latching said signal S1 and passing said signal S1 to said switch;

a circuit C2 having an output coupled to said switch input for generating said signal S1; and a circuit C3 for comparing a current value of said signal S1 with a previously sampled value of said signal S1, said circuit C3 causing said latch L1 to latch the current value if said current value is different from the previously sampled value.

13. The integrated circuit of claim 12 wherein:

said circuit C1 comprises a processor;
said circuit C2 comprises a peripheral device; and
said signal S1 is an interrupt signal.

14. The integrated circuit of claim 12 wherein said circuit C2 is clocked by a signal asynchronous with respect to said clock signal.

15. An integrated circuit of claim 12, wherein said signal SA is derived from a register, wherein said register is accessible from an external pin.

16. An electrical circuit having first and second circuit sections, the first circuit section being clocked by a clock signal and responsive to a first input signal from a second circuit section, comprising the steps of:

means for identifying a clock signal pulse at which a second input signal anticipatory of the first input signal is substantially certain to be asserted for a properly functioning second circuit section;

means for identifying a range of clock signal pulses preceding the identified clock signal pulse within which the second input signal may be asserted for a properly functioning second circuit section;

means for determining a first circuit section response characteristic to the second input signal after the identified range;

means for blocking the first input signal from the first circuit section during the identified range of pulses;

means for unblocking the first input signal after the blocking step;

means for generating a first circuit section response characteristic to the unblocked first input signal; and means for comparing the generated response to the determined response to test the electrical circuit.

* * * * *